(12) United States Patent
Gupta et al.

(10) Patent No.: US 9,282,433 B2
(45) Date of Patent: Mar. 8, 2016

(54) SYSTEM AND/OR METHOD OF LOCATING A PORTABLE SERVICE ACCESS TRANSCEIVER

(71) Applicant: QUALCOMM Incorporated, San Diego, CA (US)

(72) Inventors: Rajarshi Gupta, Sunnyvale, CA (US); Saumitra Mohan Das, Santa Clara, CA (US); Douglas Neal Rowitch, Honolulu, HI (US); Vinay Sridhara, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 13/712,819

(22) Filed: Dec. 12, 2012

(65) Prior Publication Data
US 2014/0162589 A1   Jun. 12, 2014

(51) Int. Cl.
| H04W 4/22 | (2009.01) |
| H04W 4/04 | (2009.01) |
| H04W 4/02 | (2009.01) |
| H04W 64/00 | (2009.01) |
| G01S 5/02 | (2010.01) |
| H04W 84/00 | (2009.01) |
| H04W 84/04 | (2009.01) |

(52) U.S. Cl.
CPC .............. *H04W 4/023* (2013.01); *G01S 5/02* (2013.01); *H04W 64/003* (2013.01); *H04W 84/005* (2013.01); *H04W 84/045* (2013.01)

(58) Field of Classification Search
CPC .................................. H04W 4/22; H04W 4/04
USPC .............. 455/404.2, 423, 424, 456.1, 456.2, 455/456.3, 456.5, 456.6
See application file for complete search history.

(56) References Cited

U.S. PATENT DOCUMENTS

| 6,047,192 | A * | 4/2000 | Maloney ................... G01S 5/12 342/450 |
| 6,744,740 | B2 | 6/2004 | Chen |
| 7,542,763 | B2 | 6/2009 | Russell et al. |
| 8,055,272 | B1 | 11/2011 | Wilson |
| 2008/0267114 | A1 | 10/2008 | Mukherjee et al. |
| 2010/0062791 | A1* | 3/2010 | Wang et al. ................. 455/456.1 |
| 2010/0085947 | A1* | 4/2010 | Ringland et al. .............. 370/338 |
| 2010/0120447 | A1* | 5/2010 | Anderson et al. .......... 455/456.1 |
| 2010/0144366 | A1* | 6/2010 | Ishii et al. ................... 455/456.1 |
| 2010/0323714 | A1* | 12/2010 | Schmidt et al. ............ 455/456.1 |
| 2011/0028166 | A1* | 2/2011 | Ketchum ............. H04J 3/0688 455/456.5 |
| 2011/0086636 | A1 | 4/2011 | Lin |
| 2011/0092237 | A1 | 4/2011 | Kato et al. |
| 2011/0116416 | A1 | 5/2011 | Dobson et al. |
| 2011/0201349 | A1* | 8/2011 | Castillo et al. ............. 455/456.1 |
| 2011/0210843 | A1 | 9/2011 | Kummetz |
| 2011/0235627 | A1 | 9/2011 | Wang |

OTHER PUBLICATIONS

International Search Report and Written Opinion—PCT/US2013/074469—ISA/EPO—Jul. 24, 2014.

* cited by examiner

*Primary Examiner* — Christopher M Brandt
(74) *Attorney, Agent, or Firm* — Berkeley Law & Technology Group, LLP (57) ABSTRACT

Described are devices, methods, techniques and systems for locating a portable services access transceiver (PSAT) for use in aiding emergency "911" services. In one implementation, one or more conditions indicative of movement of a PSAT may initiate a process for obtaining a new estimated location of the PSAT. In another implementation, a location of a PSAT may be determined or updated using indoor navigation techniques.

21 Claims, 7 Drawing Sheets

SYSTEM AND/OR METHOD OF LOCATING A PORTABLE SERVICE ACCESS TRANSCEIVER

BRIEF DESCRIPTION

1. Field

Embodiments described herein are directed to techniques for locating devices.

2. Information

Implementation of location based services by network carriers has prompted government regulators to require "911" emergency services in that an emergency distress call from a cellular telephone are to be accompanied with an estimated location of the cellular telephone making the call. To facilitate this feature, a cellular telephone may have capabilities to estimate its own position from acquiring signals from global positioning system (GPS) satellites or from other satellite positioning systems (SPS), or from acquiring signals from terrestrial transmitters using techniques such as observed time difference of arrival (OTDOA) and/or advanced forward link trilateration (AFLT). In other examples, a location of the cellular telephone may be roughly estimated by determining a current cell that is serving the cellular telephone, and associating the known location of the serving cell with a location of the calling telephone. In yet other examples, a location of a mobile device in an indoor environment may estimate its location based, at least in part, on acquisition of signals transmitted from local transmitters (e.g., IEEE Std. 802.11 or Bluetooth transmitters).

To expand coverage for mobile telephony subscribers, wireless carrier networks have been incorporating nodes as part of a self organizing network (SON). Such nodes may comprise femto cells which may be installed by homeowners and small business owners to expand coverage where not provided by existing base stations in the wireless carrier network. Like other cellular base stations, a femto cell may support 911 emergency services.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Briefly, particular implementations are directed to a method comprising, at a portable service access transceiver: determining an estimated location of the portable service access transceiver; transmitting one or more first messages including said estimated location to a server for use in a positioning service; detecting one or more conditions indicative of movement of the portable service access transceiver relative to a point of reference; and transmitting one or more second messages to said server indicating a reliability of or uncertainty in said estimated location in response to said detection of said one or more conditions.

Another particular implementation is directed to a portable service access transceiver comprising: a transmitter to transmit messages to locations on a communication network; and a processor to: determine an estimated location of the portable service access transceiver; initiate transmission of one or more first messages including said estimated location through said transmitter to a server for use in a positioning service; detect one or more conditions indicative of movement of the portable service access transceiver relative to a point of reference; and initiate transmission of one or more second messages through said transmitter to said server indicating a reliability of or uncertainty in said estimated location in response to said detection of said one or more conditions.

Another particular implementation is directed to an article comprising: a non-transitory storage medium comprising machine-readable instructions stored thereon which are executable by a special purpose computing apparatus to: determine an estimated location of a portable service access transceiver; initiate transmission of one or more first messages including said estimated location to a server for use in a positioning service; detect one or more conditions indicative of movement of the portable service access transceiver relative to a point of reference; and initiate transmission of one or more second messages to said server indicating a reliability of or uncertainty in said estimated location in response to said detection of said one or more conditions.

Another particular implementation is directed to an apparatus comprising: means for determining an estimated location of the portable service access transceiver; means for transmitting one or more first messages including said estimated location to a server for use in a positioning service; means for detecting one or more conditions indicative of movement of the portable service access transceiver relative to a point of reference; and means for transmitting one or more second messages to said server indicating a reliability of or uncertainty in said estimated location in response to said detection of said one or more conditions.

Another particular implementation is directed to a method comprising, at a personal service access transceiver (PSAT): communicating with a location server to obtain indoor navigation assistance data; acquiring one or more indoor navigation signals; and computing an estimate of a location of the PSAT based, at least in part, on application of characteristics of at least one of said acquired signals to said indoor navigation assistance data.

Another particular implementation is directed to a portable service access transceiver (PSAT) comprising: a receiver to acquire wirelessly transmitted signals; and a processor to: communicate with a location server to obtain indoor navigation assistance data; obtain characteristics one or more indoor navigation signals acquired at said receiver; and compute an estimate of a location of the PSAT based, at least in part, on application of characteristics of at least one of said acquired signals to said indoor navigation assistance data.

Another particular implementation is directed to a method comprising, at a server: transmitting indoor navigation assistance data to a portable service access transceiver (PSAT); receiving an estimate of a location of said PSAT determined based, at least in part, on said transmitted indoor navigation assistance data; and updating said indoor navigation assistance data in a storage medium to include said received estimate of said location of said PSAT and an identifier of said PSAT, said updated indoor navigation assistance data to be made available to mobile devices.

Another particular implementation is directed to a server comprising: a communication interface; and one or more processors to: initiate transmission of indoor navigation assistance data to a portable service access transceiver (PSAT); obtain an estimate of a location of said PSAT received at said communication interface and determined based, at least in part, on said transmitted indoor navigation assistance data; and update said indoor navigation assistance data in a storage medium to include said received estimate of said location of said PSAT and an identifier of said PSAT, said updated indoor navigation assistance data to be made available to mobile devices for positioning operations.

Another particular implementation is directed to an article comprising: a storage medium comprising machine-readable instructions stored thereon which are executable by a special purpose computing apparatus to: initiate transmission of indoor navigation assistance data to a portable service access transceiver (PSAT); obtain an estimate of a location of said PSAT received at said communication interface and determined based, at least in part, on said transmitted indoor navigation assistance data; and update said indoor navigation assistance data in a storage medium to include said received estimate of said location of said PSAT and an identifier of said PSAT, said updated indoor navigation assistance data to be made available to mobile devices for positioning operations.

It should be understood that the aforementioned implementations are merely example implementations, and that claimed subject matter is not necessarily limited to any particular aspect of these example implementations.

DETAILED DESCRIPTION

While a femto cell may be repositioned by a local owner or operator, emergency services may entail determining a location of the femto cell after it has been repositioned. As pointed out above, to support "911" emergency services, a femto cell may include a global positioning system (GPS) receiver to acquire signals for estimating a location of the femto cell. In addition to adding to the cost of manufacturing a femto cell, effective operation of a GPS receiver may require placement of an indoor femto cell by a window. Also, the GPS receiver may not be effective in an urban canyon environment, regardless of whether such a femto cell is placed by a window. In this context, it is recognized that devices such as repeaters or femto cells may assist or extend coverage into indoor areas. For example, a repeater may extend coverage of a macro cellular network into an indoor area by merely amplifying uplink and downlink signals. Here, with application of a repeater, cellular communications are still provided through an existing macro network. A femto cell, on the other hand, may emulate a cellular base station by being connected to a cellular operator via a broadband Internet Protocol (IP) connection (e.g., wired or wireless). Similarly, a pico cell may extend coverage into larger indoor areas such as high-rises or subways. In this context, a femto cell may be implemented in a home environment with small number of users and a pico cell may be implemented in a larger environment to sever a large number of users. While a femto cell may be connected to a cellular operator through a broadband IP connection as discussed above, a pico cell may be connected directly to a base station controller as another base station transmitter. For a repeater and some pico cells, legacy approaches to position and location based services may apply emergency call routing. In this context, "femto cell" may refer to any device that emulates the behavior of a base station (e.g., either connected to a cellular operator through a broadband IP connection or directly to a base station controller as a pico cell).

In one implementation, in addition to or in lieu of a GPS receiver and antenna, a femto cell may be configured to employ indoor navigation techniques for obtaining a position fix by, for example, acquiring signals from indoor transmitters (e.g., WiFi access points, Bluetooth transmitters, etc.). For example, a femto cell may obtain indoor positioning assistance data from a location server that is accessible through a web service. Here, as part of a process of installing a femto cell, the femto cell may be connected to a broadband access device (e.g., DSL or cable modem). With this connection, the femto cell may download indoor positioning assistance data such as, for example, locations and identities (e.g., MAC addresses) of local transmitters or radio heatmap metadata, indoor maps, just to provide a few examples. With indoor positioning assistance data, a femto cell may compute measurements of range to the indoor transmitters (e.g., by measuring round-trip delay or signal strength) at known locations and compute a position fix. A femto cell may compute a position fix based, at least in part, on measurements of an angle of arrival of signals received from indoor transmitters at known locations. Alternatively, the femto cell may associate characteristics of acquired indoor signals (e.g., signal angle of arrival, signal strength or round-trip delay) with expected signatures at grid points in a radio heatmap to obtain an estimated location. In an alternative implementation, a femto cell may provide observations of a local signal environment (e.g., from transmitters according to IEEE Std. 802.11 or Bluetooth) to a server to enable the server to compute a location of the femto cell using one or more of the aforementioned indoor positioning techniques.

In another implementation, a femto cell may be preprogrammed with an Internet protocol (IP) address or URL of a location server capable of providing indoor navigation assistance data. To obtain correct indoor navigation assistance data, a rough location of the femto cell may be provided to the location server (e.g., most recent GPS position fix, scan of WiFi devices to obtain MAC addresses of transmitters at known, fixed locations, etc.). This rough location may be determined to be in an area covered by a context handle to be used in accessing positioning assistance data that is useful and relevant to the femto cell's current location. This context handle may also be used to corroborate any user-entered civic address or other information indicative of a location. In one implementation, with knowledge of the locations and identities of local transmitters, a femto cell may determine whether it has been moved to a different location. This may initiate a process to obtain a new/updated context handle for use in obtaining updated indoor navigation assistance data from a location server.

In another implementation, a self-locating femto cell may utilize known positions of other femto cells (e.g., with a GPS receiver/antenna and adjacent to a window) providing "anchor" nodes. Here, the self-locating femto cell may acquire signals transmitted from anchor nodes for measuring ranges to the known locations of the anchor femto cells, for example.

In yet another implementation, a femto cell may detect conditions indicative of movement of the femto cell, possibly suggesting a changed location. The femto cell may then transmit one or more messages to a location sever to provide an alert as to a reduced certainty or reliability of a previously determined estimated location the femto cell. Alternatively, the femto cell may initiate operations to obtain an updated estimate of its location.

Figure 1:
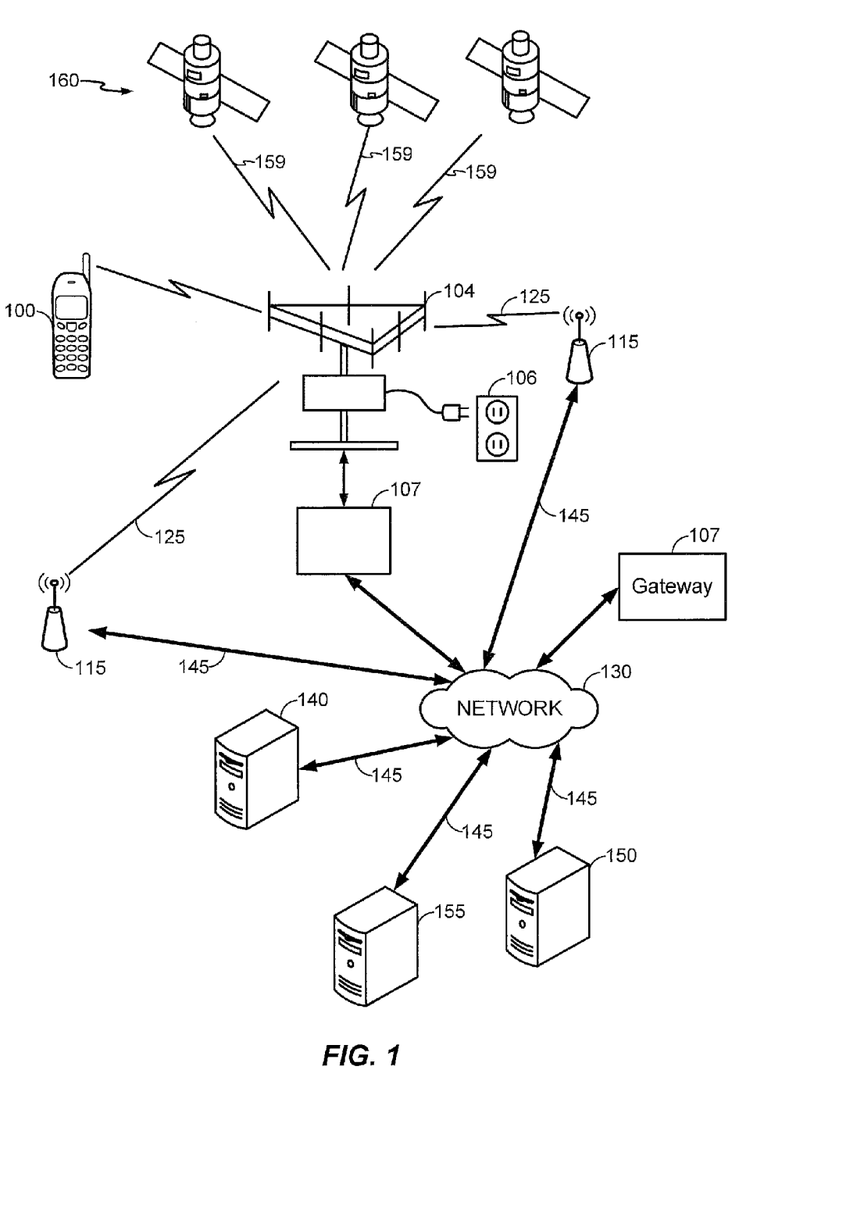
FIG. 1 is a system diagram illustrating certain features of a system containing a portable service access transceiver, in accordance with an implementation.

FIG. 1 is a diagram of a system comprising a portable service access transceiver (PSAT) 104 which may enable a mobile device to wirelessly access one or more networks according to a communication protocol such as a wireless local area network (WLAN) protocol, personal area network (PAN), wireless wide area network (WWAN) protocol, just to provide a few of examples. In a particular implementation, PSAT 104 may comprise a femto cell enabling access to a cellular carrier network. For example, PSAT 104 may be placed in an indoor environment and connected through a broadband connection (e.g., through a DSL or cable modem) to network 130. PSAT 104, and other PSATs facilitating communication with a service provider (not shown), may communicate the service provider via gateway 107. Here, gateway 107 may connect to proprietary switches (not shown) to perform functions of a mobile switching center (MSC) to provide cellular service to mobile device 100. PSAT 104 may receive power from an external power source 106 such as a utility-grade alternating current power outlet. In other examples, PSAT 104 may receive power from other types of external power sources such as a generator or battery. It should be understood that this is merely an example of how a PSAT may be integrated with a network to extend coverage of a service operator, and claimed subject matter is not limited in this respect.

As pointed out above, an estimated location of PSAT 104 may be used to support "911" emergency services to mobile device 100. For example, PSAT 104 may determine an estimate of its location using one or more techniques described below. This estimate of the location of PSAT 104 may then be provided to mobile device 100 or stored at a location server (e.g., one or more of servers 140, 150 or 155). The estimated location of PSAT 104 may be used to route a call to an appropriate Public Safety Answering Point (PSAP) to provide an emergency response. Such an appropriate PSAP may comprise a closest PSAP to a location of PSAT 104 and/or mobile device 100. In an optional implementation, once a call is established with an appropriate PSAP, the estimated location of PSAT 104 or mobile device 100 may be forwarded to the appropriate PSAP to notify the appropriate PSAP of an approximate location of the user needing assistance.

In certain implementations, as shown in FIG. 1, PSAT 104 may receive or acquire satellite positioning system (SPS) signals 159 from SPS satellites 160. In some embodiments, SPS satellites 160 may be from a global navigation satellite system (GNSS), such as the GPS or Galileo satellite systems. In other embodiments, the SPS Satellites may be from multiple GNSS such as, but not limited to, GPS, Galileo, Glonass, or Beidou (Compass) satellite systems. In other embodiments, SPS satellites may be from any one several regional navigation satellite systems (RNSS') such as, for example, Wide Area Augmentation System (WAAS), European Geostationary Navigation Overlay Service (EGNOS), Quasi-Zenith Satellite System (QZSS), just to name a few examples.

As pointed out above, PSAT 104 may provide mobile device 100 wireless access to a network according to a cellular communication protocol, for example. In addition, PSAT 104 may transmit radio signals to, and receive radio signals from, other wireless access devices such as local transceivers 115 through wireless links 125. Here, a local transceiver 115 may comprise a peer PSAT device. In a particular implementation, local transceivers 115 may provide access to a wireless local area network (WLAN, e.g., IEEE Std. 802.11 network) or wireless personal area network (WPAN, e.g., Bluetooth network). In another example implementation, a local transceiver 115 may comprise a femto cell transceiver capable of facilitating communication on link 125 according to a cellular communication protocol. Of course it should be understood that these are merely examples of networks that may communicate with a mobile device over a wireless link through a local transceiver, and claimed subject matter is not limited in this respect.

In a particular implementation, local transceivers 115 may communicate with servers 140, 150 and 155 over a network 130 through links 145. Here, network 130 may comprise any combination of wired or wireless links. In a particular implementation, network 130 may comprise Internet Protocol (IP) infrastructure capable of facilitating communication between or among PSAT 104, servers 140, 150 or 155, and/or gateway 107.

In particular implementations, and as discussed below, PSAT 104 may have circuitry and processing resources capable of computing a position fix or estimated location of PSAT 104. For example, PSAT 104 may compute a position fix based, at least in part, on pseudorange measurements to four or more SPS satellites 160. Here, PSAT 104 may compute such pseudorange measurements based, at least in part, on pseudonoise code phase detections in signals 159 acquired from four or more SPS satellites 160. In particular implementations, PSAT 104 may receive from server 140, 150 or 155 positioning assistance data to aid in the acquisition of signals 159 transmitted by SPS satellites 160 including, for example, almanac, ephemeris data, Doppler search windows, just to name a few examples.

In other implementations, PSAT 104 may obtain a position fix by processing signals received from terrestrial transmitters fixed at known locations (e.g., base station transceiver, not shown) using any one of several techniques such as, for example, advanced forward trilateration (AFLT) and/or observed time difference of arrival (OTDOA). In these particular techniques, a range from PSAT 104 may be measured to three or more of such terrestrial transmitters fixed at known locations based, at least in part, on signals transmitted by the transmitters fixed at known locations and received at PSAT 104. Here, servers 140, 150 or 155 may be capable of providing positioning assistance data to PSAT 104 including, for example, locations and identities of terrestrial transmitters to facilitate positioning techniques such as AFLT and OTDOA. In one particular example, servers 140, 150 or 155 may provide assistance data for acquisition of cellular signals for obtaining measurements (e.g., in the case of synchronous LTE networks using a Positioning Reference Signal (PRS)). In other embodiments, measurements obtained at mobile device 100 from acquisition of signals may be forwarded to a server for computation of an estimated location of the mobile device.

In particular environments such as indoor environments or urban canyons, PSAT 104 may not be capable of acquiring signals 159 from a sufficient number of SPS satellites 160 or perform AFLT or OTDOA to compute a position fix, or may be able to compute a position fix, but with an unacceptable accuracy. Alternatively, PSAT 104 may be capable of computing a position fix based, at least in part, on signals acquired from local transmitters (e.g., WLAN access points positioned at known locations). For example, PSAT 104 may obtain a position fix by measuring characteristics of signals transmitted from three or more indoor terrestrial wireless access points which are positioned at known locations. Such signal characteristics may be measured and associated with particular wireless access points positioned at known locations by, for example, obtaining a MAC ID address from signals received from such access points. A position fix may be obtained by measuring one or more characteristics of signals received from such access points such as, for example, received signal strength (RSSI), round trip time (RTT) or angle of arrival (AOA), just to name a few examples. In alternative implementations, PSAT 104 may obtain an indoor position fix by applying characteristics of acquired signals to a radio heatmap (e.g., radio frequency (RF) fingerprinting matching or RF signature matching) indicating expected RSSI and/or RTT signatures at particular locations in an indoor area. In particular implementations, a radio heatmap may associate identities of local transmitters (e.g., a MAC address which is discernible from a signal acquired from a local transmitter), expected RSSI from signals transmitted by the identified local transmitters, an expected RTT from the identified transmitters, and possibly standard deviations from these expected RSSI or RTT. The aforementioned examples of employing signals transmitted by local transmitters allows for the use of these signals as "indoor navigation signals" where signals transmitted from an SPS or macro cellular infrastructure cannot be reliably acquired. It should be understood, however, that these are merely examples of values that may be stored in a radio heatmap for application to acquired signals, and that claimed subject matter is not limited in this respect.

In particular implementations, PSAT 104 may receive positioning assistance data for indoor positioning operations from servers 140, 150 or 155. For example, such positioning assistance data may include locations and identities of transmitters positioned at known locations to enable measuring characteristics of signals acquired from such as, for example a measured RSSI, RTT and/or AOA. Other positioning assistance data to aid indoor positioning operations may include radio heatmaps, locations and identities of transmitters, routeability graphs, just to name a few examples. In one implementation, PSAT 104 may receive as positioning assistance data a routeability graph and/or digital map to assist PSAT 104 in defining feasible areas for navigation within an indoor area based on physical obstructions (e.g., walls) and passage ways (e.g., doorways in walls). Here, by defining feasible areas for navigation, PSAT 104 may apply constraints to aid in the application of filtering measurements for estimating locations and/or motion trajectories according to a motion model (e.g., according to a particle filter and/or Kalman filter). In addition to measurements obtained from the acquisition of signals from local transmitters, according to a particular embodiment, PSAT 104 may further apply a motion model to measurements or inferences obtained from inertial sensors (e.g., accelerometers, gyroscopes, magnetometers, etc.) and/or environment sensors (e.g., temperature sensors, microphones, barometric pressure sensors, ambient light sensors, camera imager, etc.) in estimating a location or motion state of PSAT 104. In alternative implementations, PSAT 104 may transmit messages containing measurements to a remote location server (e.g., server 140, 150 or 155) so that the remote location server may estimate a location or motion state of PSAT 104 based, at least in part, on the aforementioned assistance data.

According to an embodiment, PSAT 104 may access indoor navigation assistance data through servers 140, 150 or 155 by, for example, requesting the indoor assistance data through selection of a universal resource locator (URL). In particular implementations, servers 140, 150 or 155 may be capable of providing indoor navigation assistance data to cover many different indoor areas including, for example, floors of buildings, wings of hospitals, terminals at an airport, portions of a university campus, areas of a large shopping mall, just to name a few examples. In another implementation, a PSAT may obtain a context handle (e.g., for use in obtaining indoor navigation assistance data) by first obtaining at least a rough current location of PSAT 104. In one example, such a rough current location may comprise a location estimate obtained from a latest SPS position fix. In another example, the rough current location may comprise a user-entered location. PSAT 104 may then provide the obtained context handle in request for indoor navigation assistance data covering an area including the rough current location. Also, memory resources at PSAT 104 and data transmission resources may make receipt of indoor navigation assistance data for all areas served by servers 140, 150 or 155 impractical or infeasible, a request for indoor navigation assistance data from PSAT 104 may indicate a rough or course estimate of a location of PSAT 104 (e.g., a most recent position fix or manually entered data). PSAT 104 may then be provided indoor navigation assistance data covering areas including and/or proximate to the rough or course estimate of the location of PSAT 104.

In particular embodiments, a mobile device (e.g., mobile device 100) may receive indoor navigation assistance data through a wireless downlink. PSAT 104, on the other hand, may reliably receive indoor navigation assistance data through a wired connection. Here, PSAT 104 may comprise a communication adapter for transmitting and receiving messages over a wired link to a communication network. For example, if PSAT 104 is implemented as a femto cell, PSAT may receive indoor navigation assistance data from a from a broadband Internet service over a twisted-pair, coaxial or optical cable) that is used for transporting cellular traffic. Similarly, if PSAT 104 is implemented as a pico cell, PSAT 104 may receive navigation assistance data from a backhaul connection to a base station controller. It should be understood, however, that these are merely examples of how a PSAT may receive indoor navigation assistance data over a wired connection, and claimed subject matter is not limited in this respect.

In one particular implementation, PSAT 104 may be pre-programmed with an address to a server for obtaining indoor navigation assistance data. Here, PSAT 104 may transmit a last known SPS position fix, scans of MAC addresses of signals acquired from local transmitters (e.g., IEEE Std. 802.11 access points) to a server at the pre-programmed address. The server may respond with context handles or other resource identifiers that PSAT 104 may subsequently use to request indoor navigation assistance data that is relevant to its current environment. Using a received context handle, PSAT 104 may request indoor navigation assistance data by, for example, presenting the context handle in a request message transmitted to a server. A response to such a request message may return indoor navigation assistance data covering an area covered by the context handle such as, for example, locations and identities of access points serving the area covered by the presented context handle or a radio heatmap for the area. Here, if PSAT 104 is moved to a different location with the area covered by the context handle, the PSAT 104 may have sufficient navigation assistance data for obtaining a subsequent position fix without requesting additional indoor navigation assistance data.

Figure 2:
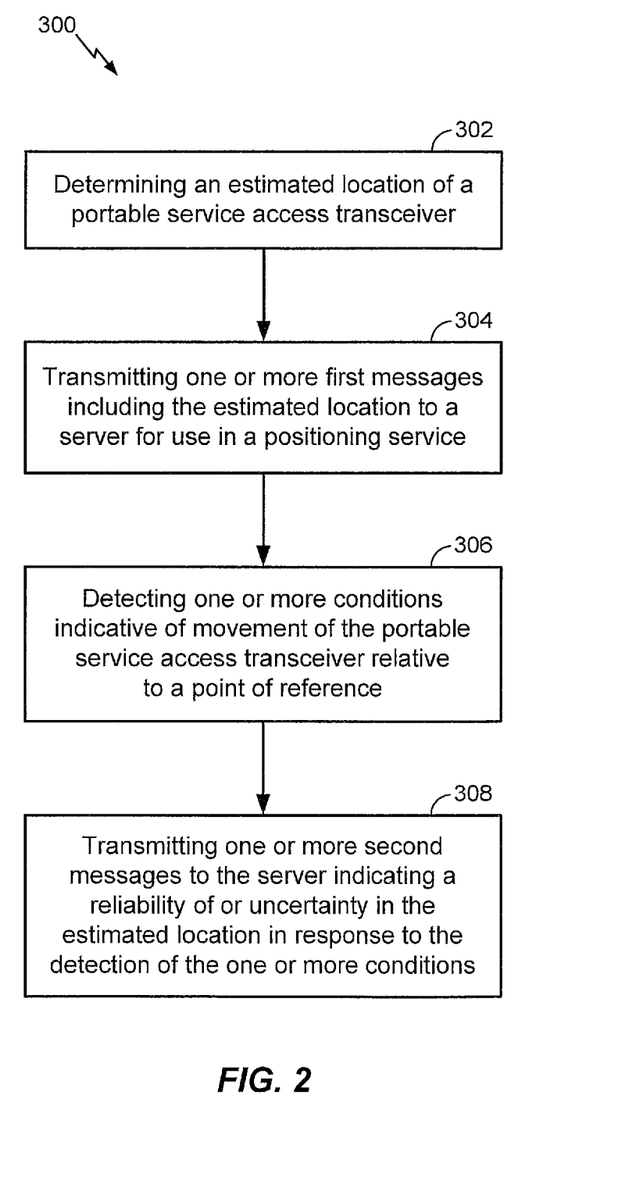
FIG. 2 is a flow diagram illustrating a process of updating certainty or reliability of an estimated location of a portable service access transceiver according to an embodiment.

As pointed out above, an estimated location of a PSAT (e.g., PSAT 104) may be used for routing an emergency call to an appropriate PSAP. Also, a PSAT (e.g., PSAT 104) may forward messages to a location server indicating an estimated location of the PSAT for use in dispatch of "911" emergency services to mobile devices in range to communicate with the PSAT. Since a PSAT may be easily disconnected and moved to a different location, there is a possibility that an estimated location of the PSAT stored in a location server is incorrect or unreliable. FIG. 2 is a flow diagram of a process for addressing an impact of possible movement of a PSAT on its location as indicated in a location server.

At block 302, a PSAT may determine an estimate of its location using any one of several techniques as discussed above (e.g., acquisition of signals transmitted from SPS transmitters or application of indoor positioning techniques). Additionally, an estimated location of a PSAT may be programmed manually at a user interface or a web interface. At block 304, as described above, a PSAT may transmit one or more messages to a location server including an estimated location of the PSAT determined at block 302. The location server may then store the estimated location of the PSAT for future use in dispatching "911" emergency services, for example.

As pointed out above, a PSAT may be easily disconnected and moved to a different location within a building or home, making an estimated location of the PSAT stored in a location server unreliable or incorrect. As such, it may be useful to assess or qualify the reliability of accuracy of an estimated location of a PSAT stored in a location server. As pointed out above, an estimated location of a PSAT may be used to infer a location of a mobile device that is within range to acquire a signal transmitted by or receive access services from the PSAT. As pointed out above, this inferred location may then be used for routing a call to an appropriate PSAP. Here, if an estimated location of the PSAT is deemed to be unreliable or inaccurate, other measurements, estimates, approximations or inferences of a location of the mobile device may be used for dispatching emergency services, for example. For example, if an estimated location of a PSAT stored in a location server may be deemed to be unreliable, and other estimates the PSAT's location are available, these other estimates of the PSAT's location may be used in lieu of the estimated location deemed to be unreliable.

At block 306, a PSAT may detect one or more conditions indicative of movement of the PSAT. As discussed above in particular implementations, a PSAT may be readily disconnected from one location and moved to a different location. As discussed above in reference to FIG. 1, a PSAT may be connected at a fixed location at an external power source (e.g., wall utility outlet) or wired service access gateway (e.g., gateway 107). One condition indicative of movement of a PSAT may comprise a disruption or discontinuity of power from an external power source, which may suggest that the PSAT has been unplugged from a wall outlet. As pointed out above, a PSAT may have a wired connection to IP infrastructure through a gateway to communicate with a BSC/MSC in providing access services to a mobile device. To facilitate messaging between a PSAT and BSC/MSC, a domain name server (DNS, not shown) may dynamically assign an IP address to the PSAT according to a Dynamic Host Configuration Protocol (DHCP). Detection of a newly allocated IP address may indicate a possible disconnection of the PSAT from a physical connection with an access gateway. Here, this condition may be evaluated with or independently of any possible disconnection of a PSAT from an external power source to infer possible movement of the PSAT to a different location. Block 306 may detect other conditions indicative if a possible movement of the PSAT such as, for example, signals from motion detection sensors (e.g., inertial sensors such as accelerometers, gyroscopes, magnetometers) indicative of movement or signals from environmental sensors (e.g., ambient light sensors, heat sensors, barometric pressure sensors, camera imager, etc.) indicative of a change in environment. In another example implementation, a PSAT may detect one or more conditions indicative of movement based, at least in part, on acquisition of signals transmitted from local transmitters. For example, acquisition of a local signal may indicate a change range between the PSAT and a local transmitter base, at least in part, on a change in received signal strength, change in round trip time or change in acquired signal phase, just to provide a few examples. In another example, a condition indicating a possible change in position of a PSAT may be detected from signals transmitted from a macro cellular network, WLAN, WPAN, etc. and observed at the PSAT. For example, new or different base stations and/or access points may be observable relative to past observations. It should be understood that the aforementioned conditions indicative of possible movement of a PSAT relative to a point of reference (e.g., previously estimated location) are merely example conditions, and that claimed subject matter is not limited in this respect.

At block 308, in response to the one or more conditions detected at block 307, a PSAT may transmit one or more messages to a location server indicating that a previously obtained and stored estimate of a location of the PSAT is unreliable. The location server may then handle the dispatch of emergency "911" services accordingly.

According to an embodiment, a PSAT may transmit local signals to provide a beacon for use by mobile devices for obtaining a position fix using one or more of the aforementioned techniques (e.g., application of an acquired signal to a signature in a radio heatmap or trilateration using ranges measured from RTT or RSSI, or application of AOA). As pointed out above in block 304, a PSAT may transmit an estimate of its location to a server for use in a positioning server. If the estimate of the PSAT's location is sufficiently accurate and reliable, the PSAT may provide an "anchor" among other transmitters having a known location. For example, the estimate of the PSAT's location and the PSAT's identity (e.g., a cell ID or MAC address) may be maintained in a storage medium at a server and provided to mobile devices along with locations and identities of other transmitters included in indoor navigation assistance data (e.g., in response to a request specifying a context handle). In one particular implementation, a server may selectively include the estimate of the PSAT's location based, at least in part, on an indication of accuracy or reliability of the estimate computed at the PSAT. For example, along with receipt of an estimate of the PSAT's location, a server may also receive an indication of a variance and/or uncertainty metric of the estimate. Here, if the variance and/or uncertainty metric exceed a threshold value, a server may not include the estimate of the PSAT's location in indoor navigation assistance data to be provided for use by mobile devices in position in operations.

Figure 3:
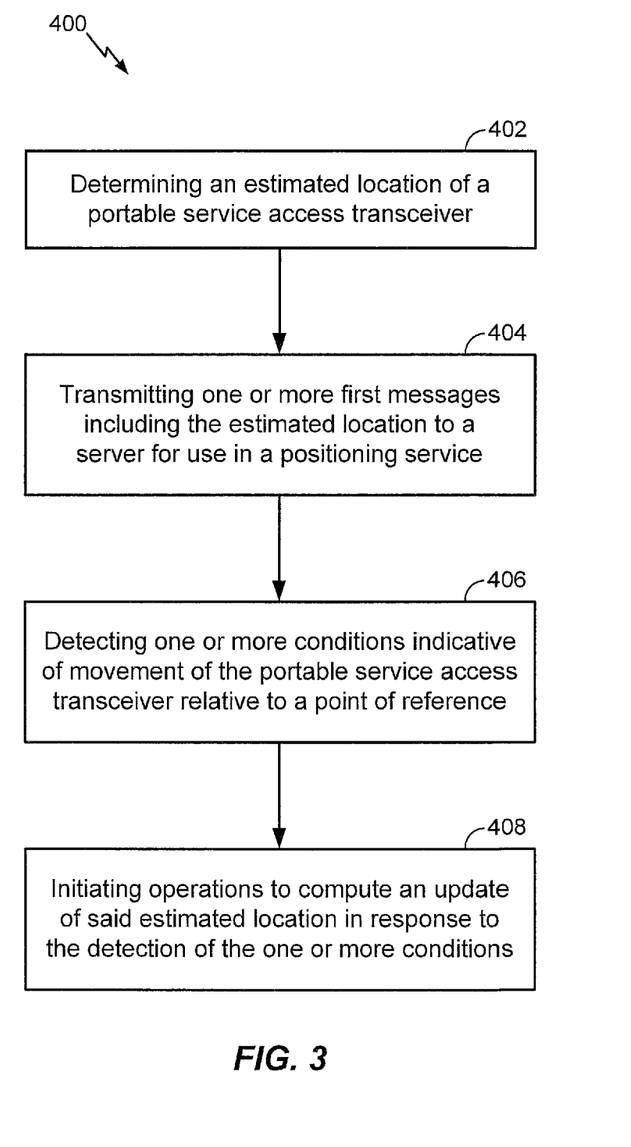
FIG. 3 is a flow diagram illustrating a process of updating an estimated location of a portable service access transceiver, according to an embodiment.

FIG. 3 is a flow diagram of an alternative implementation in which a location of a PSAT may be re-estimated in response to conditions indicating that a previous estimate is unreliable. In a particular implementation, blocks 402, 404 and 406 may be performed as described above in blocks 302, 304 and 306, respectively. At block 408, however, a PSAT may initiate operations to compute an update of an estimated location in response to detection of one or more conditions set forth in block 406. Such operations may include, for example, acquiring an processing SPS signals, indoor positioning techniques, just to provide a few examples. In alternative implementations, in addition to initiating positioning operations at block 406, a PSAT may also transmit one or more messages to a location server indicating that the previous location estimate is unreliable as described above for block 308. In yet another alternative implementation, a PSAT may conditionally transmit one or more messages to a location server as described above for block 308 if positioning operations initiated at block 408 fail or provides inconclusive or ambiguous results.

Figure 4A:
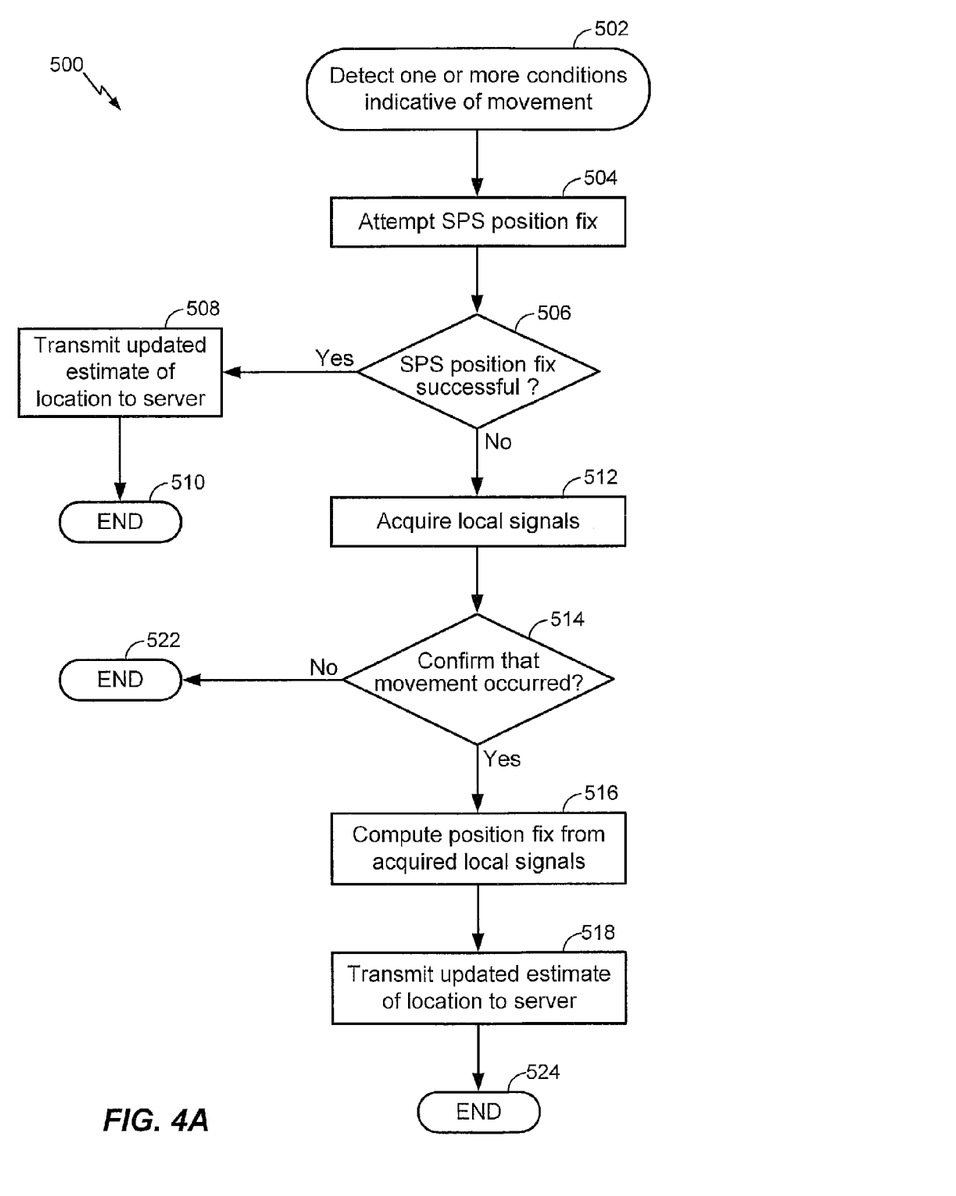
FIG. 4A is a flow diagram illustrating a process of updating an estimated location of a portable service access transceiver according to an alternative embodiment.

FIG. 4A is a flow diagram of a process 500 to initiate operations to compute an update of an estimated location in response to one or more conditions indicative of movement (e.g., performed at block 408 of FIG. 3) as detected at event 502. At block 504, a PSAT may attempt to obtain a position fix by acquisition of SPS signals. If the attempt to obtain a position fix by acquisition of SPS signals as determined at diamond 506, block 508 may transmit an updated estimate of a location of the PSAT to a location server and process 500 may terminate at 510.

However, as pointed out above, an SPS receiver of a PSAT may not be capable of acquiring signals from an sufficient number of SPS transmitters to obtain a position fix (e.g., if the PSAT is located in an indoor environment and does not have a sufficient number of SPS transmitters "in view"). While a position fix obtained from acquisition of SPS signals is typically very accurate, other techniques for obtaining a position fix (e.g., using indoor navigation techniques) may be less accurate. As discussed above, conditions detected at event 502 may comprise disruption in an external power source or new dynamically assigned IP address. In a particular implementation, process 500 may perform additional inquiry to confirm, with greater confidence, that a PSAT has moved before possibly replacing a current location estimate (e.g., obtained using acquisition of SPS signals) with a potentially less accurate location estimate (e.g., obtained from indoor positioning techniques).

If the attempt to obtain an SPS position fix at block 504 is not successful, block 512 may attempt to acquire local signals such as, for example, signals transmitted by local transmitters including WLAN access points, Bluetooth devices etc. using techniques discussed above. Based, at least in part on characteristics of local signals acquired at block 512, diamond 514 may apply one or more tests to confirm, with a particular degree of confidence, that the PSAT had in fact been moved from its previous location. For example, a PSAT may maintain a history of characteristics of acquired local signals stored in a memory device, including characteristics of local signals acquired from local transmitters while the PSAT was at its previous location. In this example, these characteristics of local signals may include a unique transmitter identifier (e.g., a MAC address), RSSI, RTT, just to name a few examples. If local signals acquired at block 512 indicate, for example, a change in signal environment, diamond 514 may infer that significant movement of the PSAT has occurred. Such a change in environment may be inferred, for example, by a presence of signals acquired from new local transmitters that were not acquired at the previous location and/or an absence of signals acquired at the PSAT from transmitters that were present while the PSAT was at the previous location. Such a change in environment may also be detected if, for example, there is a database change in characteristics (e.g., RSSI or RTT) of signals acquired by the PSAT from while at the previous location change. In another implementation, movement of a PSAT may be confirmed, at least in part, from observations of signals from a WWAN (which may include signals transmitted from macro cellular transmitters or other nearby PSATs). Here, changes in the identities of transmitters which are observable from signals at a PSAT may indicate a change in position of the PSAT. It should be understood, however, that these are merely examples of how movement of a PSAT may be confirmed with greater confidence, and that claimed subject matter is not limited in this respect. If movement of a PSAT is confirmed with greater confidence at diamond 514, an updated position fix from acquired local signals may be computed at block 516 and an updated estimated location may be transmitted to a location server at block 518. Process 500 may then terminate at 524.

Figure 4B:
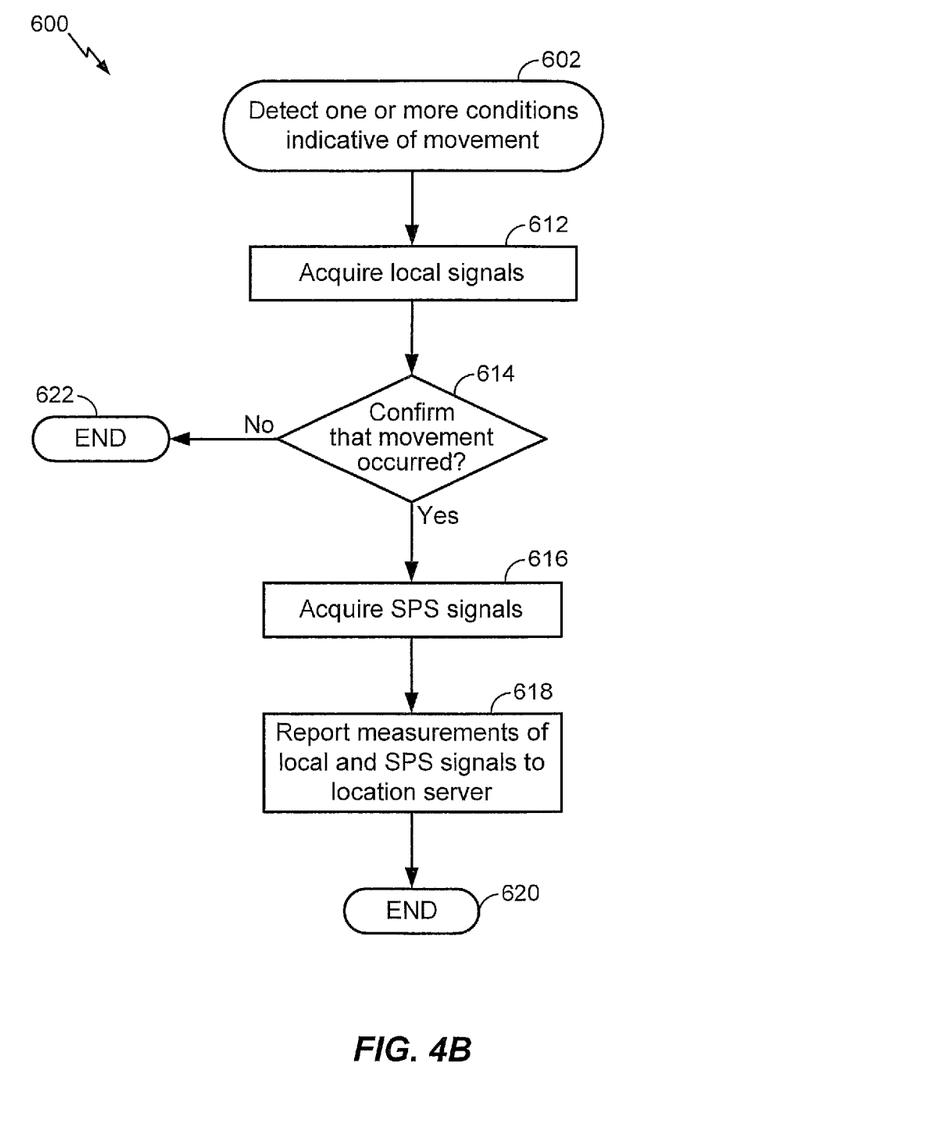
FIG. 4B is a flow diagram illustrating a process of updating an estimated location of a portable service access transceiver according to another alternative embodiment.

FIG. 4B is a flow diagram of a process 600 to initiate operations to compute an update of an estimated location remotely at a location server in response to one or more conditions indicative of movement (e.g., performed at block 408 of FIG. 3) as detected at event 602. Block 612 may acquire local signals at a PSAT as discussed above in block 512 for the embodiment of FIG. 4A. If movement of the PSAT is confirmed at diamond 614 (e.g., using techniques implemented in diamond 514 above), the PSAT may acquire SPS signals at block 616, and then report measurements of local signals (e.g., obtained at block 612) and SPS signals (e.g., obtained at block 616) to a location server to compute an estimated location of the PSAT.

Figure 5:
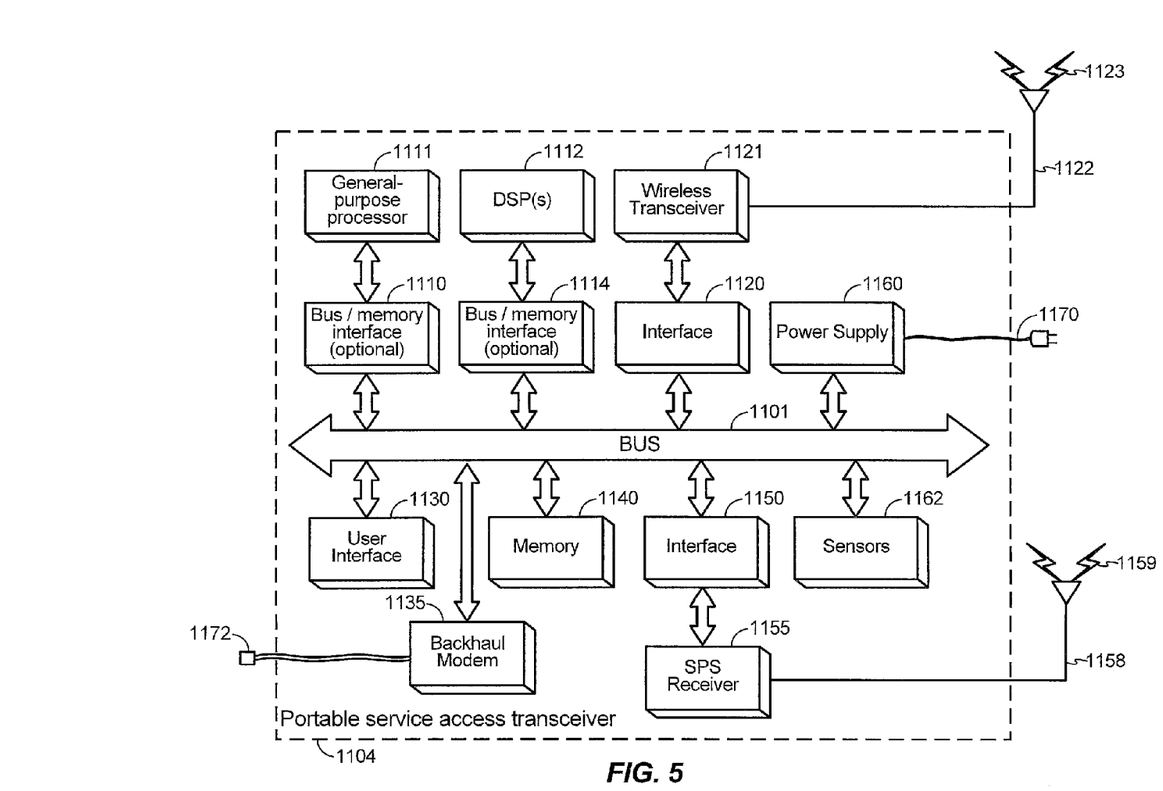
FIG. 5 is a schematic block diagram illustrating an exemplary portable service access transceiver, in accordance with an implementation.

FIG. 5 is a schematic diagram of a PSAT according to an embodiment. PSAT 104 (FIG. 1) may comprise one or more features of PSAT 1104 shown in FIG. 5. In certain embodiments, PSAT 1104 may also comprise a wireless transceiver 1121 which is capable of transmitting and receiving wireless signals 1123 via an antenna 1122 over a wireless communication network. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to a corresponding multiple wireless communication standards such as, for example, WiFi, CDMA, WCDMA, LTE and Bluetooth, just to name a few examples.

PSAT 1104 may also comprise SPS receiver 1155 capable of receiving and acquiring SPS signals 1159 via SPS antenna 1158. SPS receiver 1155 may also process, in whole or in part, acquired SPS signals 1159 for estimating a location of PSAT 1104. In some embodiments, general-purpose processor(s) 1111, memory 1140, DSP(s) 1112 and/or specialized processors (not shown) may also be utilized to process acquired SPS signals, in whole or in part, and/or calculate an estimated location of PSAT 1104, in conjunction with SPS receiver 1155. Storage of SPS or other signals for use in performing positioning operations may be performed in memory 1140 or registers (not shown).

Also shown in FIG. 5, PSAT 1104 may comprise digital signal processor(s) (DSP(s)) 1112 connected to the bus 1101 by a bus interface 1110, general-purpose processor(s) 1111 connected to the bus 1101 by a bus interface 1110 and memory 1140. Bus interface 1110 may be integrated with the DSP(s) 1112, general-purpose processor(s) 1111 and memory 1140. In various embodiments, functions may be performed in response to execution of one or more machine-readable instructions stored in memory 1140 such as on a non-transitory computer-readable storage medium, such as RAM, ROM, FLASH, or disc drive, just to name a few example. The one or more instructions may be executable by general-purpose processor(s) 1111, specialized processors, or DSP(s) 1112. Memory 1140 may comprise a non-transitory processor-readable memory and/or a computer-readable memory that stores software code (programming code, instructions, etc.) that are executable by processor(s) 1111 and/or DSP(s) 1112 to perform functions or operations described herein.

Also shown in FIG. 5, a user interface 1130 may comprise any one of several devices such as, for example, a speaker, microphone, display device, vibration device, keyboard, touch screen, just to name a few examples. In a particular implementation, user interface 1130 may enable a user to interact with one or more applications hosted on PSAT 1104 (e.g., to allow a user to manually specify a location for the PSAT).

PSAT 1104 may also comprise sensors 1162 coupled to bus 1101 which may include, for example, inertial sensors and environment sensors. Inertial sensors of sensors 1162 may comprise, for example accelerometers (e.g., collectively responding to acceleration of PSAT 1104 in three dimensions), one or more gyroscopes or one or more magnetometers (e.g., to support one or more compass applications). Environment sensors of PSAT 1104 may comprise, for example, temperature sensors, barometric pressure sensors, ambient light sensors, camera imagers, microphones, just to name few examples. Sensors 1162 may generate analog or digital signals that may be stored in memory 1140 and processed by DPS(s) or general purpose processor 1111 to, for example, detect one or more conditions indicative of movement of PSAT 1104 as discussed above.

In a particular implementation, a general purpose processor or DSP (e.g., general purpose/application processor 1111 or DSP(s) 1112) may be capable of performing baseband processing of signals received and downconverted at wireless transceiver 1121 or SPS receiver 1155. Similarly, a general purpose processor or DSP may perform baseband processing of signals to be upconverted for transmission by wireless transceiver 1121. It should be understood, however, that these are merely examples of structures that may perform baseband processing, and that claimed subject matter is not limited in this respect.

PSAT 1104 may comprise a power supply 1160 for receiving power from an external power source (not shown) at a power cable 1170, and for distributing power among components of PSAT 1104. Here, power supply 1160 may be cable of affecting a signal on bus 1101 to indicate whether power supply 1160 is connected to disconnected from the external power source (e.g., if battery backed power is available). General purpose processor 1111 may monitor this signal to detect a disruption in power from the external power source, possibly indicating movement of PSAT 1104 to a different location as discussed above.

PSAT 1104 may also comprise a backhaul modem 1135 for facilitating a wired communication connection to a network as a communication adapter for transmitting and receiving messages over a wired network link. For example, backhaul modem 1135 may comprise a cable modem and/or DSL modem for providing broadband access to IP infrastructure. In particular implementations as discussed above, PSAT 1140 may communicate through backhaul modem 1135 to a gateway and/or soft switches to support wireless access services to mobile devices. In other embodiments, backhaul model 1135 may provide a direct connection to a base station controller for transporting cellular service traffic, messages requesting indoor navigation assistance data or messages providing indoor navigation assistance data. Backhaul modem 1135 may also provide one or more signals on bus 1101 indicating whether a new IP address has been dynamically assigned to PSAT (e.g., according to DHCP as discussed above), possibly indicating movement of PSAT 1104 to a different location as discussed above.

Figure 6:
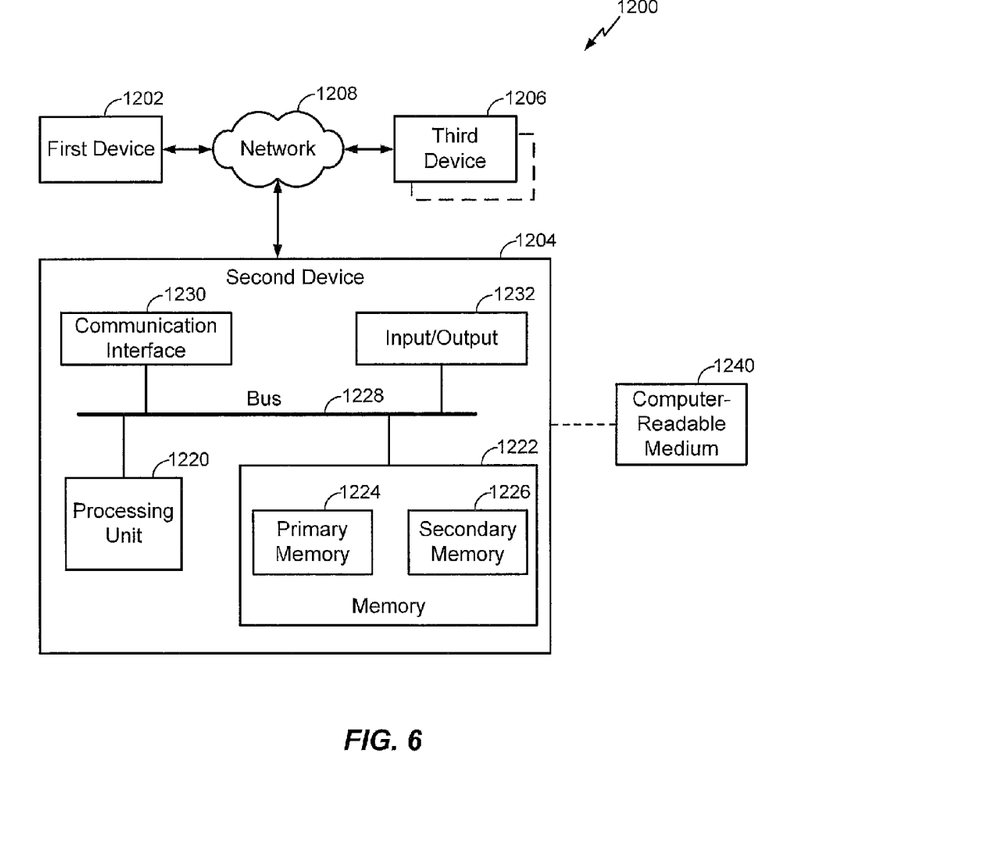
FIG. 6 is a schematic block diagram of an example computing platform.

FIG. 6 is a schematic diagram illustrating an example system 1200 that may include one or more devices configurable to implement techniques or processes described above, for example, in connection with FIG. 1. System 1200 may include, for example, a first device 1202, a second device 1204, and a third device 1206, which may be operatively coupled together through a wireless communications network 1208. In an aspect, first device 1202 may comprise a server capable of providing positioning assistance data such as, for example, a base station almanac. First device 1202 may also comprise a server capable of providing an LCI to a requesting mobile device based, at least in part, on a rough estimate of a location of the requesting mobile device. First device 1202 may also comprise a server capable of providing indoor positioning assistance data relevant to a location of an LCI specified in a request from a mobile device. Second and third devices 1204 and 1206 may comprise mobile devices, in an aspect. Also, in an aspect, wireless communications network 1208 may comprise one or more wireless access points, for example. However, claimed subject matter is not limited in scope in these respects.

First device 1202, second device 1204 and third device 1206, as shown in FIG. 6, may be representative of any device, appliance or machine that may be configurable to exchange data over wireless communications network 1208. By way of example but not limitation, any of first device 1202, second device 1204, or third device 1206 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/ system, a network service provider/system, an Internet or intranet service provider/system, a portal or search engine service provider/system, a wireless communication service provider/system; or any combination thereof. Any of the first, second, and third devices 1202, 1204, and 1206, respectively, may comprise one or more of a base station almanac server, a base station, or a mobile device in accordance with the examples described herein.

Similarly, wireless communications network 1208, as shown in FIG. 10, is representative of one or more communication links, processes, or resources configurable to support the exchange of data between at least two of first device 1202, second device 1204, and third device 1206. By way of example but not limitation, wireless communications network 1208 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1206, there may be additional like devices operatively coupled to wireless communications network 1208.

It is recognized that all or part of the various devices and networks shown in system 1200, and the processes and methods as further described herein, may be implemented using or otherwise including hardware, firmware, software, or any combination thereof.

Thus, by way of example but not limitation, second device 1204 may include at least one processing unit 1220 that is operatively coupled to a memory 1222 through a bus 1228.

Processing unit 1220 is representative of one or more circuits configurable to perform at least a portion of a data computing procedure or process. By way of example but not limitation, processing unit 1220 may include one or more processors, controllers, microprocessors, microcontrollers, application specific integrated circuits, digital signal processors, programmable logic devices, field programmable gate arrays, and the like, or any combination thereof.

Memory 1222 is representative of any data storage mechanism. Memory 1222 may include, for example, a primary memory 1224 or a secondary memory 1226. Primary memory 1224 may include, for example, a random access memory, read only memory, etc. While illustrated in this example as being separate from processing unit 1220, it should be understood that all or part of primary memory 1224 may be provided within or otherwise co-located/coupled with processing unit 1220.

Secondary memory 1226 may include, for example, the same or similar type of memory as primary memory or one or more data storage devices or systems, such as, for example, a disk drive, an optical disc drive, a tape drive, a solid state memory drive, etc. In certain implementations, secondary memory 1226 may be operatively receptive of, or otherwise configurable to couple to, a computer-readable medium 1240. Computer-readable medium 1240 may include, for example, any non-transitory medium that can carry or make accessible data, code or instructions for one or more of the devices in system 1200. Computer-readable medium 1240 may also be referred to as a storage medium.

Second device 1204 may include, for example, a communication interface 1030 that provides for or otherwise supports the operative coupling of second device 1204 to at least wireless communications network 1208. By way of example but not limitation, communication interface 1230 may include a network interface device or card, a modem, a router, a switch, a transceiver, and the like.

Second device 1204 may include, for example, an input/output device 1232. Input/output device 1232 is representative of one or more devices or features that may be configurable to accept or otherwise introduce human or machine inputs, or one or more devices or features that may be configurable to deliver or otherwise provide for human or machine outputs. By way of example but not limitation, input/output device 1232 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("COMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femto cell, utilized to extend cellular telephone service into a business or home. In such an implementation, one or more mobile devices may communicate with a femto cell via a code division multiple access ("CDMA") cellular communication protocol, for example, and the femto cell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method comprising, at a portable service access transceiver:
    determining an estimated location of the portable service access transceiver;
    transmitting one or more first messages including the estimated location to a server for use in a positioning service;
    detecting one or more conditions indicative of movement of the portable service access transceiver relative to a point of reference;
    transmitting one or more second messages to the server indicating a reliability of or uncertainty in the estimated location in response to the detection of the one or more conditions; and
    in response to the detecting of one or more conditions indicative of movement, the portable service access transceiver computing an updated estimated location based, at least in part, on one or more signals acquired from one or more local transmitters, the one or more local transmitters utilizing a wired backhaul.

2. The method of claim 1, wherein the detecting of the one or more conditions further comprises:
    acquiring the one or more signals transmitted from the one or more local transmitters; and
    detecting a change in characteristics of at least one of the one or more signals.

3. The method of claim 2, wherein the characteristics comprise a received signal strength, round-trip time or signal phase.

4. The method of claim 2, and further comprising:
    inferring that locations of the one or more local transmitters have not changed in response to the detected change; and
    inferring that a location of the portable service access transceiver has changed in response to the inference that locations of the one or more local transmitters have not changed.

5. The method of claim 4, wherein inferring that the locations of the one or more local transmitters have not changed further comprises:
    comparing a measurement of one or more characteristics of at least one signal of the one or more signals acquired from the one or more local transmitters obtained following detection of the one or more conditions with a measurement of one or more characteristics of that the at least one signal obtained prior to detection of the one or more conditions.

6. The method of claim 1, and further comprising initiating operations to compute an updated position fix in response to detecting the one or more conditions.

7. The method of claim 6, and further comprising obtaining the updated position fix based, at least in part, on acquisition of signals transmitted from stationary indoor transmitters.

8. The method of claim 1, and further comprising:
    transmitting service traffic to, and receiving service from, a wired network according to an Internet Protocol (IP), and wherein detecting the one or more conditions comprises detecting a newly allocated IP address.

9. The method of claim 1, wherein detecting the one or more conditions comprises detecting a disconnection of the portable service access transceiver from a power source.

10. The method of claim 1, and further comprising attempting to compute the updated estimate of location of the portable service access transceiver based, at least in part, on acquisition of satellite positioning system (SPS) signals at the portable service access transceiver.

11. The method of claim 1, wherein the computing of the updated estimated location of the portable service access transceiver occurs after unsuccessfully attempting to compute the updated estimated location based, at least in part, on acquisition of SPS signals.

12. A portable service access transceiver comprising:
    a transmitter to transmit messages to locations on a communication network; and
    a processor to:
        determine an estimated location of the portable service access transceiver;
        initiate transmission of one or more first messages including the estimated location through the transmitter to a server for use in a positioning service;
        detect one or more conditions indicative of movement of the portable service access transceiver relative to a point of reference;

initiate transmission of one or more second messages through the transmitter to the server indicating a reliability of or uncertainty in the estimated location in response to the detection of the one or more conditions; and confirm movement of the portable service access transceiver and, in response to the detection of one or more conditions indicative of movement, compute an updated estimated location of the portable service access transceiver based, at least in part, on one or more signals acquired from one or more local transmitters, the one or more local transmitters utilizing a wired backhaul.

13. The portable service access transceiver of claim 12, and further comprising a power supply to provide a connection to an external power source, and wherein the processor is further to detect the one or more conditions responsive, at least in part, to detection of disruption of the connection.

14. The portable service access transceiver of claim 12, and further comprising a modem to connect to a broadband communication network, and wherein the processor is further to detect the one or more conditions responsive, at least in part, to allocation of a new Internet Protocol address to the portable service access transceiver.

15. The portable service access transceiver of claim 12, and wherein the processor is further to:
infer that locations of one or more beacons have not changed in response to a detected change in characteristics of at least one of one or more signals acquired from one or more beacons; and
infer that a location of the portable service access transceiver has changed in response to the inference that locations of the one or more beacons have not changed.

16. The portable service access transceiver of claim 12, and wherein the processor is further to initiate operations to compute an updated position fix in response to detecting the one or more conditions.

17. The portable service access transceiver of claim 16, and wherein the processor is further to obtain the updated position fix based, at least in part, on acquisition of signals transmitted from stationary indoor beacons.

18. The mobile of claim 12, and wherein the processor is further to:
initiate transmission of service traffic to, and receive service from a wired network according to an Internet Protocol (IP), and wherein detecting the one or more conditions comprises detecting a newly allocated IP address.

19. An article comprising:
a non-transitory storage medium comprising machine-readable instructions stored thereon which are executable by a special purpose computing apparatus to:
determine an estimated location of a portable service access transceiver;
initiate transmission of one or more first messages including the estimated location to a server for use in a positioning service;
detect one or more conditions indicative of movement of the portable service access transceiver relative to a point of reference;
initiate transmission of one or more second messages to the server indicating a reliability of or uncertainty in the estimated location in response to the of the one or more conditions; and
confirm movement of the portable service access transceiver and, in response to the detecting of one or more conditions indicative of movement, compute an updated estimated location of the portable service access transceiver based, at least in part, on one or more signals acquired from one or more local transmitters, the one or more local transmitters having a wired backhaul.

20. The article of claim 19, and wherein the instructions are further executable by the special purpose computing apparatus to:
infer that locations of the one or more local transmitters have not changed in response to a detected change in characteristics of at least one of one or more signals acquired from the one or more local transmitters; and
infer that a location of the portable service access transceiver has changed in response to the inference that locations of the one or more local transmitters have not changed.

21. An apparatus comprising:
means for determining an estimated location of the portable service access transceiver;
means for transmitting one or more first messages including the estimated location to a server for use in a positioning service;
means for detecting one or more conditions indicative of movement of the portable service access transceiver relative to a point of reference;
means for transmitting one or more second messages to the server indicating a reliability of or uncertainty in the estimated location in response to the detection of the one or more conditions;
means for confirming movement of the portable service access transceiver; and
means for computing an updated estimated location of the portable service access transceiver responsive to one or more signals generated by the means for detecting one or more conditions indicative of movement, the means for computing an updated estimated location of the portable service access transceiver based, at least in part, on one or more signals acquired from one or more local transmitters, the one or more local transmitters having a wired backhaul.

* * * * *